United States Patent [19]

Struck

[11] 4,066,283
[45] Jan. 3, 1978

[54] HIGH PRESSURE INSULATED COUPLING

[75] Inventor: Leslie G. Struck, Arlington Heights, Ill.

[73] Assignee: Chicago Fittings Corporation, Broadview, Ill.

[21] Appl. No.: 655,896

[22] Filed: Feb. 6, 1976

[51] Int. Cl.² .............................................. F16L 11/12
[52] U.S. Cl. ..................................... 285/53; 285/369; 285/379; 285/383
[58] Field of Search .......... 285/52, 53, 379, DIG. 11, 285/383, 369, 54, 354, 47, 342

[56] References Cited

U.S. PATENT DOCUMENTS

| | | | |
|---|---|---|---|
| 848,549 | 3/1907 | Howley et al. | 285/374 |
| 1,536,785 | 5/1925 | Gold | 285/379 |
| 2,269,695 | 1/1942 | Scharf | 285/53 |
| 3,632,141 | 1/1972 | Larsson | 285/383 X |
| 3,700,266 | 10/1972 | Glehn | 285/383 X |
| 3,944,262 | 3/1976 | Stiner et al. | 285/53 |

FOREIGN PATENT DOCUMENTS

| | | | |
|---|---|---|---|
| 695,027 | 8/1953 | United Kingdom | 285/242 |

OTHER PUBLICATIONS

Tec-Line advertising brochure; series 101 Insulated Coupling, 2 pages, Tec-Line Products, 4975 Starr St., SE. Grand Rapids, MI 49506, Tele. 616-949-4530.

*Primary Examiner*—Dave W. Arola
*Attorney, Agent, or Firm*—Haight, Hofeldt, Davis & Jambor

[57] ABSTRACT

To join two pipe sections carrying fluids that may be at relatively high pressures, a coupling body into which the ends of the pipe sections are inserted has a gasket seal at each end thereof. In order to electrically insulate the sections of pipe from one another, an insulating sleeve is located along a length of the internal surface of the coupling body. An insulating stop member is slidable within the sleeve to separate the ends of the sections of pipe, the stop member being prevented from entering the length of the coupling body that does not have an insulating sleeve. Threads for coupling nuts utilized in achieving the fluid tight seal are formed in the outer surface of the coupling body at each end thereof.

9 Claims, 5 Drawing Figures

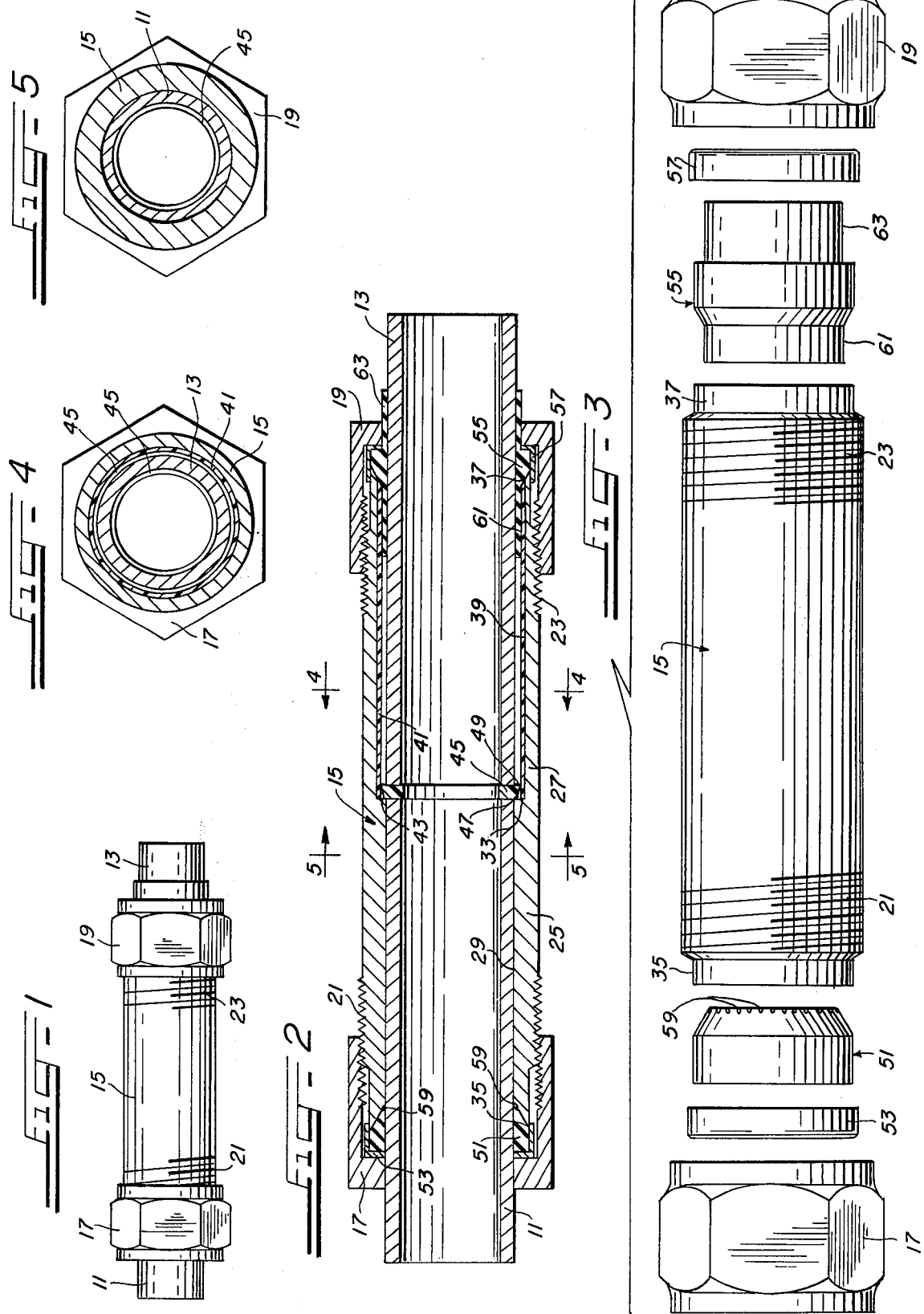

HIGH PRESSURE INSULATED COUPLING

BACKGROUND OF THE INVENTION

1. Field of the Invention

This invention relates generally to an arrangement for coupling two sections of pipe, and more specifically, this invention relates to a coupling for mechanically joining two sections of pipe which may carry fluids at relatively high pressures while electrically insulating the sections of pipe from one another.

2. Description of the Prior Art

In coupling pipes that are to carry fluids under relatively high pressures, such as in gas and oil transmission lines, it is necessary that a good mechanical joint be combined with a good seal to prevent leakage of the fluid. Also, as the pipes being coupled are normally electrically conductive metallic members, it is desirable to electrically insulate the sections of pipe being coupled, in order to prevent formation of an electrical current flow path from one section of pipe to the other.

One of the best, if not the best, high pressure insulated couplings found in the prior art is that manufactured by the company to which the present application is assigned. In this device, a heavy wall seamless steel tubing provides a coupling body. Threads are welded or swaged to the outer surface of the coupling body at each end thereof. A polypropylene lining is located along the inner surface of the coupling body. A plastic sliding stop of a so called "waffle" design is utilized to slide within the polypropylene lining and separate the ends of the sections of pipe being joined with an insulating layer. Threaded coupling nuts are located at each end of the coupling to engage the threads on the coupling body and compress appropriate gaskets. One of the gaskets includes an exposed metallic beaded ring to provide a bond between the coupling body and that section of pipe, while the other gasket is formed entirely of rubber and overlaps the polypropylene lining to provide complete insulation at that end of the coupling body.

While this prior art coupling has shown great utility and has performed very well in use, it has some disadvantages in that it is relatively large and relatively expensive. As a result, although no other prior art coupling can compare in terms of performance and reliability, there are some areas in which improvements can be made.

SUMMARY OF THE INVENTION

The present invention obviates the disadvantages of the prior art device without sacrificing any of the advantages thereof. Accordingly, the present invention provides a smaller, less expensive coupling that provides the requisite mechanical coupling strength, fluid seal and electrical insulation.

In the preferred embodiment disclosed herein, a first length of the coupling body is formed with a first internal diameter, while a second length is formed with a second internal diameter. By making the internal diameter of the second length greater than that of the first length, a discrete separation or discontinuity is formed between the two lengths. By having the first length extend inwardly from the first end of the coupling body to approximately the middle of the coupling body, with the second length extending inwardly from a second end of the coupling body to the inner termination of the first length, the coupling body is divided into two roughly equal segments or lengths. An insulating sleeve or liner, such as a polypropylene sheath, is located in the second length. This insulating liner or sleeve has a thickness less than the difference between the internal diameters of the first and second lengths of the coupling body, so that the inner end of the first length provides an extending shoulder adjacent the end of the insulating sleeve.

A specially constructed sliding stop member is arranged to slide within the insulating sleeve. This stop member is in the form of a frusto-conical annulus, so that the smaller diameter end may be easily slid within the insulating sleeve, while the larger diameter end tends to oppose withdrawal of the stop member, with what may be described as "fish hook" action. The shoulder formed at the junction of the first and second length of the coupling body prevents the frusto-conical annulus from being inserted into the first length of the coupling body.

As in the case of the prior art device manufactured by the assignee of the present application, a coupling nut is utilized at each end of the coupling. Each of these coupling nuts has an associated retainer cup and a corresponding gasket. One of the gaskets is arranged to provide a bond between the coupling body and the associated section of pipe, while the other gasket, located at the end of the coupling body from which the second length extends, overlaps the insulating sleeve and extends through the coupling nut, so that the section of pipe at the second end of the coupling body is completely insulated from the coupling body.

There are many advantages in the coupling of the present invention. For instance, by using only half the length of the insulating sleeve within the coupling body, only half the quantity of material, such as polypropylene, forming the insulating sleeve is required. This, of course, reduces the cost of the insulating liner. At the same time, with the discontinuity formed by the different internal diameters of the first and second lengths of the coupling body, the insulating sleeve is easier to insert and secure in place. Further, the frusto-conical annular stop member uses less material and is more easily insertable into the coupling body, while at the same time providing a greater opposition to withdrawal, than is found in the older "waffle" stop member design.

In addition, the formation of the threads directly on the outer surface of the coupling body has many desirable effects. First of all, the formation of the threads directly in the coupling body involves much less time and effort than the formation of separate threaded members which are welded or swaged onto the coupling body. At the same time, the formation of the threads directly in the coupling body means that smaller coupling nuts, retainer cups and gaskets may be utilized, with the resultant decrease in size and cost of these elements. (As an aside, it may be noted that for some sizes the threads can be directly machined into the coupling body, as opposed to being cast.) Further, since the mechanical bonding to the pipe sections is a function of the threading and the area of contact, the smaller gaskets create a much greater bonding load—tests indicating that the pull-out strength is increased as much as by a factor of two.

Therefore, the coupling of the present invention provides a high pressure insulated coupling that is smaller and less expensive than the best prior art device, while at the same time providing an improved mechanical coupling with an equivalent, or improved, fluid seal and equivalent electrical insulation.

These and other objects, advantages and features of this invention will hereinafter appear, and for purposes of illustration, but not of limitation, an exemplary embodiment of the present invention is shown in the appended drawing.

BRIEF DESCRIPTION OF THE DRAWING

FIG. 1 is an elevational view of a high pressure insulated coupling constructed in accordance with the present invention.

FIG. 2 is a longitudinal cross sectional view of the high pressure insulated coupling of FIG. 1.

FIG. 3 is an exploded elevational view of the coupling illustrated in FIG. 1.

FIG. 4 is a cross sectional view taken along lines 4—4 of FIG. 2.

FIG. 5 is a cross sectional view taken along lines 5—5 of FIG. 2.

DETAILED DESCRIPTION OF THE PREFERRED EMBODIMENT

FIG. 1 illustrates a coupling constructed in accordance with the present invention. This coupling is utilized to connect two sections of pipe 11 and 13, which are utilized to convey a fluid under relatively high pressure. Examples of such a usage may be for the conveyance of natural gas or oil, such as the fuel pipes leading to a home heating unit.

The coupling arrangement includes a coupling body 15, which in this preferred embodiment is generally cylindrical and formed of a metal, such as a heavy wall seamless steel tubing. The coupling body is enclosed by coupling nuts 17 and 19, which mate, respectively, with threads 21 and 23 on the coupling body 15. Coupling nuts 17 and 19 compress suitable gaskets to provide a mechanical coupling between the coupling body 15 and the sections of pipe 11 and 13, while at the same time providing a fluid type seal for the relatively high pressure fluids in the pipe sections 11 and 13.

By reference to the cross sectional view of FIG. 2, the features of this invention are more clearly set forth. The coupling body 15 is composed of a first length 25 and a second length 27. As may be seen, first length 25 has an internal surface 29 with a diameter less than the diameter of the internal surface 31 of the second length 27. Accordingly, the internal diameter of length 25 is less than the internal diameter of length 27. This results in a discontinuity 33 along the internal surface of coupling body 15.

First length 25 of coupling body 15 extends inwardly from a first end 35 of coupling body 15 for approximately half the total length of coupling body 15. Therefore, the inner end of length 25, at which point the discontinuity 33 exists, is approximately at the middle of the coupling body 15. Of course, the location of the discontinuity 33 may be shifted as desired, but in this preferred embodiment a location at approximately the middle of the coupling body 15 is utilized. Accordingly, the second length 27 of coupling body 15 extends inwardly from a second end 37 of the coupling body 15, with an inner end at the discontinuity 33.

To achieve the desired electrical insulation, an insulating sheath or sleeve 41 is located along the inner surface of the second length 27 of coupling body 15. Sleeve 41 may be formed of any desired insulating material, but in this preferred embodiment a plastic, such as polypropylene, is utilized. The sleeve 41 extends from just inside the second end 37 of coupling body 15 to the discontinuity 33. The thickness of the insulating polypropylene sleeve 41 is less than the length of the discontinuity 33 (i.e., less than the difference between the internal diameters of first length 25 and second length 27). As a result, an extending shoulder 43 protrudes beyond the insulating sleeve 41 toward the central axis of the coupling body 15 (compare FIGS. 4 and 5). Since the sleeve or lining 41 extends for only approximately half the length of coupling body 15, only about half the polypropylene is required as in the lining utilized in the prior art device manufactured by the assignee of the present application. In addition, the sleeve 41 may be easily slid into the second length 27 of coupling body 15 until it abuts against the discontinuity 33, at which point it may be secured in any appropriate manner. Thus, insertion of sleeve 41 may be easily and quickly accomplished.

In order to prevent the inner ends of the pipe sections 11 and 13 from abutting and forming an electrically conductive path, a stop member 45 is utilized. Stop member 45 is formed of a suitable nonconductive plastic in the form of a frusto-conical annulus. The annulus has a smaller diameter end 47 and a larger diameter end 49. Stop member 45 is arranged to slide within the insulating sleeve 41. Upon insertion, the smaller diameter end 47 is inserted first as it is adapted to easily slide within sleeve 41, while the larger diameter end 49 fits much more tightly. Accordingly, once the stop member 45 has been positioned, the larger diameter end opposes withdrawal in a "fish hook" type of action.

Stop member or annulus 45 is precluded from insertion into the first length 25 of coupling body 15 by the extending shoulder 43. This insures that the section of pipe 13 does not have its inner end extended beyond the insulating sleeve 41. Of course, it is not necessary to have the annulus 45 directly abutting shoulder 43, as the section of pipe 11 could be inserted further into second length 27 of coupling body 15, if this were desired in a particular application. It is just that the end of the pipe section 13 cannot be extended into first length 25 without voiding the effect of the insulation, and hence the necessity of limiting the extent of movement of the annulus 45.

With this insulating stop member 45, considerably less plastic is required than in the "waffle" design of the prior art. In addition, this stop member 45 is more easily insertable into the coupling, while at the same time providing greater resistance to withdrawal.

The mechanical coupling and fluid tight seal achieved by coupling nut 17 and 19 may be best understood by reference to FIGS. 2 and 3. Coupling nut 17 has an associated gasket 51 and a retainer cup 53 to provide the desired bonding and sealing at the first end 35 of coupling body 15. Similarly, coupling 19 has an associated gasket 55 and retainer cup 57 for providing the mechanical connection and seal at the second end 37 of coupling body 15. Retainer cups 53 and 57 are conventional metallic cup-shaped members fitting within the coupling nuts 17 and 19.

Gasket 51 may be a "beaded tip" type of gasket, in which the gasket is formed of a suitable compressible material, such as rubber, having a series of exposed metallic beads at the inner end thereof. As coupling nut 17 has its internal threads engage threads 21 on coupling body 15, gasket 59 is compressed and deformed, and the metallic beads 59 are forced into engagement with the coupling body 15 and the section of pipe 11. This forms a metallic bond between the coupling body 15 and the pipe section 11.

Gasket 55 is formed of a compressible material, such as rubber, which is also electrically nonconductive. Gasket 55 has a forwardly extending portion 61 and a rearwardly extending portion 63. When the internal threads of coupling nut 19 engage threads 23 on coupling body 15, gasket 55 is compressed to form a mechanical bond to pipe section 13, while the forwardly extending portion 61 overlaps sleeve 41. At the same time, the rearwardly extending portion 63 separates the coupling nut 19 from pipe section 13 by extending therebetween. As a result, a layer of insulating material completely separates the pipe section 13 from coupling body 15 at end 37 of the coupling body. This insulating layer is formed by the sleeve 41, the frusto-conical annulus 45 and the gasket 55. It may be noted also that this insulating layer does not have any gaps, but provides a continuous insulated separation between the coupling body 15 and the pipe section 13.

Threads 21 and 23 are formed directly in the coupling body 15, so that there is no necessity of welding or swaging another member to the coupling body. As a result of directly forming the threads in the coupling body 15, the coupling nuts 17 and 19, the retainer cups 53 and 57, and the gaskets 51 and 55 may be materially reduced in size, with the consequent decrease in overall size of the coupling, as well as the reduction in cost. Also, as previously noted, decreasing the size of the gaskets increases the gripping action and hence the pull-out strength of the coupling.

It should be understood that various modifications, changes and variations may be made in the arrangements, operations and details of construction of the embodiments disclosed herein without departing from the spirit and scope of this invention.

I claim:

1. An insulated coupling for mechanically joining two sections of pipe, while electrically isolating the sections of pipe, comprising:
   a generally cylindrical coupling body into which and end of each of the sections of pipe to be joined may be inserted;
   a first length of said coupling body extending from a first end of said coupling body through which a first one of the sections of pipe is inserted;
   a second length of said coupling body extending from a second end of said coupling body through which the second of the sections of pipe is inserted;
   a generally cylindrical sleeve of insulating material having a substantially uniform diameter extending within said second length of said coupling body;
   an insulating, frusto-conical, annular stop member to separate the ends of the sections of pipe, the smaller diameter end of said annular member sliding easily within said sleeve for insertion into said coupling body and positioning along said sleeve, while the larger diameter end of said annular member fits tightly against said sleeve to oppose withdrawal therefrom;
   limiting means at the inner end of said sleeve to prevent said stop member from entering said first length of said coupling body; and
   gasket means at each end of said coupling body to connect said coupling body to the sections of pipe with a fluid tight seal.

2. An insulated coupling as claimed in claim 1 wherein said limiting means comprises a shoulder produced by having said first length of said coupling body have an internal diameter smaller than that of said second length of said coupling body, said sleeve having a thickness less than the difference between the internal diameters of said first and second lengths of said coupling body.

3. An insulated coupling as claimed in claim 1 and further comprising threads formed in the outer surface of said coupling body adjacent each of said first and second ends thereof, said gasket means including coupling nuts to engage said threads.

4. An insulated coupling for mechanically joining two sections of pipe, while electrically isolating the sections of pipe, comprising:
   a coupling body into which an end of each of the sections of pipe to be joined may be inserted;
   a first length of said coupling body having a first internal diameter;
   a second length of said coupling body having a second internal diameter, said second internal diameter being greater than said first internal diameter;
   a sleeve of insulating material located along the internal surface of said second length of said coupling body, said insulating material having a thickness less than the difference between said first and second internal diameters so that an extending shoulder is formed at the inner end of said sleeve;
   a plastic, frusto-conical annulus to separate the ends of the sections of pipe, the smaller diameter end of said annulus sliding easily within said sleeve for insertion into said coupling body and being prevented from entering said first length of said coupling body by said shoulder, while the larger diameter end of said annulus fits tightly against said sleeve to oppose withdrawal therefrom; and
   gasket means at each end of said coupling body to provide a fluid tight seal between said coupling body and the sections of pipe.

5. An insulated coupling as claimed in claim 4 wherein said sleeve is formed of polypropylene.

6. An insulated coupling as claimed in claim 4 and further comprising threads formed in the outer surface of said coupling body at first and second ends thereof.

7. An insulated coupling as claimed in claim 6 wherein said gasket means comprises:
   a first coupling nut to engage the threads formed at said first end of said coupling body;
   a second coupling nut to engage the threads formed at said second end of said coupling body;
   a first compressible gasket to be compressed upon engagement of said first coupling nut with the corresponding threads to form a fluid tight seal; and
   a second compressible gasket to be compressed upon engagement of said second coupling nut with the corresponding threads to form a fluid tight seal.

8. An insulated coupling as claimed in claim 7 wherein said second gasket;
   extends outwardly beyond said second coupling nut between said second coupling nut and the associated section of pipe; and
   extends inwardly over said sleeve, thereby providing a complete insulating layer between said coupling body and the section of pipe inserted in said second end of said coupling body.

9. An insulated coupling for mechanically joining two sections of electrically conductive pipe, while electrically isolating the sections of pipe, comprising:
- a generally cylindrical coupling body into which an end of each of the sections of pipe to be joined may be inserted;
- a first length of said coupling body having a first internal diameter, said first length extending from a first end of said coupling body to approximately the middle thereof;
- a second length of said coupling body having a second internal diameter greater than said first internal diameter, said second length extending from the other end of said coupling body to the inner end of said first length;
- a sleeve of insulating plastic located along the internal surface of said second length of said coupling body, said insulating plastic having a thickness less than the difference between said first and second internal diameters so that an extending shoulder is formed at the inner end of said sleeve;
- a frusto-conically shaped plastic annulus adapted to slide within said sleeve and prevented from entering said first length of said coupling body by said shoulder, the smaller diameter end of said annulus easily passing within said sleeve for insertion of said annulus into said coupling body, while the larger diameter end of said annulus fits tightly against said sleeve to oppose withdrawal therefrom;
- threads formed in the outer surface of said coupling body adjacent each end thereof;
- first and second coupling nuts to engage the threads at said first and second ends of said coupling body, respectively; and
- first and second compressible gaskets to be compressed by said first and second coupling nuts, respectively, said second gasket being electrically non-conductive and overlapping said sleeve of insulating plastic and extending beyond said second coupling nut;
- whereby said coupling body is completely insulated from the section of pipe inserted in said second end of said coupling body, while the sections of pipe are mechanically joined with a fluid tight seal.

* * * * *